United States Patent [19]
Plagenheff
[11] E Patent Number: Re. 32,412
[45] Reissued Date of Patent: May 12, 1987

[54] ELASTOMERIC SHOESOLE

[75] Inventor: Stanley C. Plagenheff, Largo, Fla.
[73] Assignee: Motion Analysis, Inc., Largo, Fla.

[21] Appl. No.: 803,334
[22] Filed: Dec. 2, 1985

Related U.S. Patent Documents

Reissue of:
[64] Patent No.: 4,235,026
Issued: Nov. 25, 1980
Appl. No.: 941,775
Filed: Sep. 13, 1978

[51] Int. Cl.[4] ..... A43B 13/04; A43B 13/18; A43B 13/20
[52] U.S. Cl. ..... 36/32 R; 36/3 B; 36/28; 36/29
[58] Field of Search ..... 36/32 R, 29, 28, 25 R, 36/3 R, 3 B, 35 R, 35 B

[56] References Cited

U.S. PATENT DOCUMENTS

| | | | |
|---|---|---|---|
| 302,190 | 7/1884 | Butterfield | 36/29 |
| 873,775 | 12/1907 | Nathan | 36/28 X |
| 1,559,532 | 10/1925 | Smith | 36/28 |
| 1,932,557 | 10/1933 | Meucci | 36/3 R |
| 2,150,057 | 3/1939 | Fisch | 36/29 X |
| 2,614,342 | 10/1952 | Hoza | 36/32 R |
| 2,985,971 | 5/1961 | Murawski | 36/29 |
| 3,012,342 | 12/1961 | Ramirez | 36/3 R |

FOREIGN PATENT DOCUMENTS

| | | | |
|---|---|---|---|
| 1310482 | 10/1962 | France | 36/3 R |
| 2088626 | 1/1972 | France | 36/32 R |
| 314012 | 1/1934 | Italy | 36/3 B |
| 294671 | 11/1953 | Switzerland | 36/3 R |

*Primary Examiner*—James Kee Chi
*Attorney, Agent, or Firm*—Hieken, Charles

[57] ABSTRACT

An elastomeric shoesole designed specifically for athletic activities wherein the sole contains at the outer side of the heel and/or the inner side of the ball transversely-extending, longitudinally-spaced openings which extend to approximately the longitudinal center line and wherein the respective opposite sides are substantially solid, thereby allowing the sole to yield at the outer side of the heel end to a greater extent than at the inner side and at the inner side of the ball to a greater extent than at the outer side.

10 Claims, 10 Drawing Figures

ELASTOMERIC SHOESOLE

Matter enclosed in heavy brackets [ ] appears in the original patent but forms no part of this reissue specification; matter printed in italics indicates the additions made by reissue.

BACKGROUND OF INVENTION

Shoesoles designed to provide for resilience and softness in walking and yet sufficiently resistant to displacement to prevent overloading and, hence, sharp blows and bruising are disclosed in U.S. Pat. Nos. 2,527,414 and 2,001,821. In the Hallgren Pat. No. 2,527,414, the bottom of the shoe is provided with transversely-disposed, longitudinally-spaced ribs which provide relatively large deflection at loads ordinarily imposed and relatively smaller deflection when overloaded. Since the structure is coextensive with the entire area of the sole, there is no provision for greater displacement in the areas subjected to greater stress than in other areas and so the structure does not alleviate the pressure where the impact is high in contrast with areas where there is very little impact. The U.S. Pat. No. 2,001,821 to Everston is designed to provide for yield to a greater degree at the heel than at the forepart, but does not provide for greater yield with respect to the areas which are subjected to maximum impact and so is not designed for applicant's purposes.

SUMMARY OF INVENTION

As herein illustrated, the outsole is comprised of an elastomer and is so constructed that at selected areas it will yield at a predetermined pressure to a greater degree than the remainder thereof. The selected areas are chosen to alleviate the shock of impact for given activities as, for example, the heel and the ball. For the heel, the outer sole at the heel is provided with transverse, longitudinally-spaced openings and, for the ball, like openings. The openings at the heel are confined to the outer side of the heel and those at the ball to the inner side of the ball. Preferably, the openings are of triangular configuration and are arranged in upper and lower arrays with their bases parallel to the top and bottom surfaces and with their apices interspersed. Optionally, a tubular part may be disposed in each opening.

The invention will now be described in greater detail with reference to the accompanying drawings, wherein.

The elastomeric outsole *or shoesole or shoe bottom* herein illustrated is designed for athletic shoes to reduce the effect of the impact on the portions of the bottom of the foot which are repeatedly subjected to high impact characteristic of the activity in which the participant is engaged.

This is achieved according to this invention by structuring the outsole in the area or areas *or region or regions* of *major* impact to yield to a greater degree than in the areas which are not so subject to impact. Specifically, the heel of the outsole is structured to yield a greater amount at the outer side than at the inner side and/or the forepart or ball of the outsole is structured to yield a greater amount at the inner side than at the outer side. The structured yield at the outer side of the heel is designed for runners or joggers, while the structured yield at the forepart is for tennis players, basketball players and the like.

Figure 1:
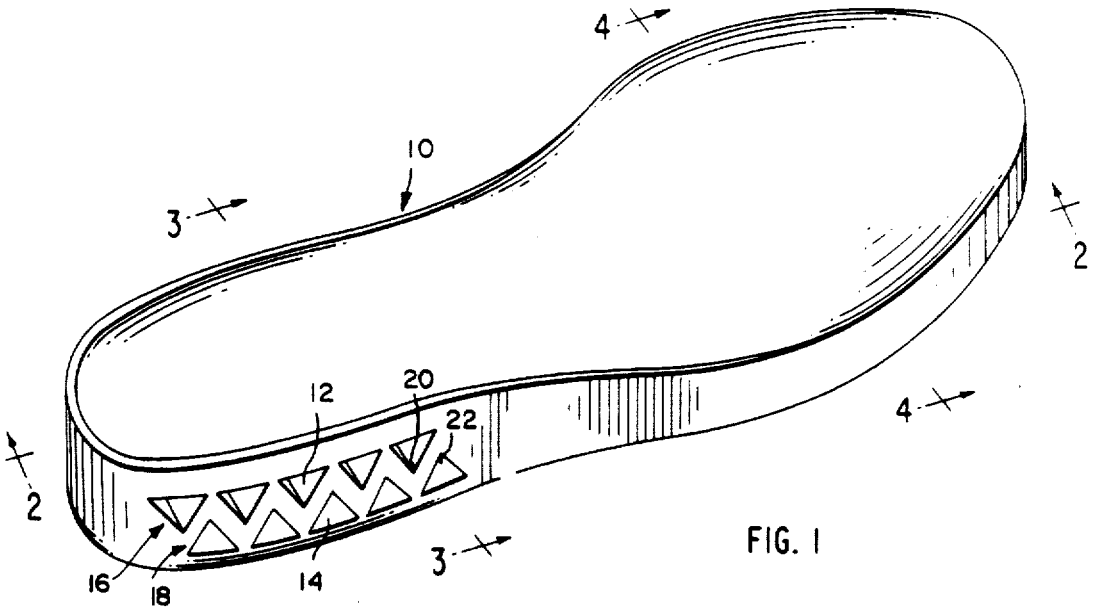
FIG. 1 is a perspective view of the elastomeric outsole unattached to a shoe upper.
Figure 2:
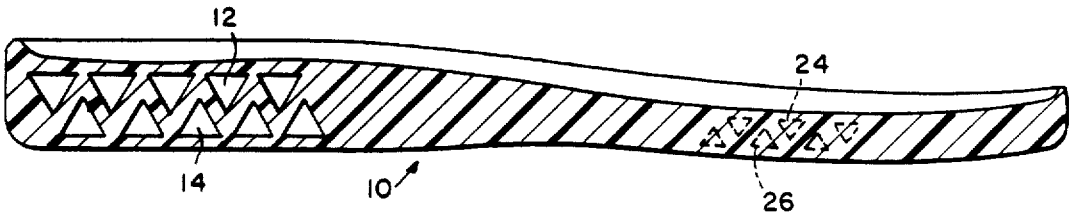
FIG. 2 is a vertical longitudinal section taken on the line 2—2 of FIG. 1.
Figure 3:
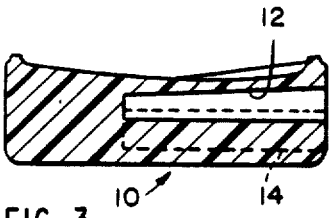
FIG. 3 is a vertical transverse section taken on the line 3—3 of FIG. 1.
Figure 4:
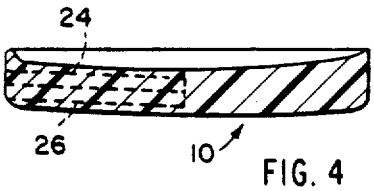
FIG. 4 is a vertical transverse section taken on the line 4—4 of FIG. 1.

The structuring for the heel comprises forming in the heel end of a sole member 10, FIG. 1, transversely-extending, longitudinally-spaced elongate openings 12,14 which extend from the outer side *face* of the heel to approximately the longitudinal center line of the outsole at the heel end *and terminating short of the inner side face of the heel substantially at right angles to the longitudinal center line.* As illustrated, there are two rows of openings, an upper row 16 and a lower row 18, and these are of triangular vertical section and so arranged that the bases of the triangular openings of the upper row and the bases of the triangular openings of the lower row are parallel to the upper and lower surfaces of the sole and their apices 20 and 22 are interspersed. The lower row of openings 18 are of uniform cross section from end-to-end whereas the upper row of openings 16 taper from their outer end to their inner end. *These openings define an area at the top side of the heel area at the outer side of the longitudinal center line of the heel area which is less in area than the entire heel area which yields at a predetermined pressure to a greater degree than the area at the inner side of the longitudinal center line of the heel.*

The openings 12,14 are confined to the heel end of the outsole and to substantially the outer half of the heel end, the inner side of the heel end being substantially solid. As thus structured, the outer side of the heel end will yield to a greater degree than the inner side so that, upon impact, the foot at the heel end will roll about its longitudinal axis through such a distance as to reduce the shock, that is, reduce the force of impact by slowing the decleration of the foot. According to the relation $Ft=mv$; $F=m_t^v$; $F=ma$ wherein $F$=force, $t$=time, $m$=mass and $V$=velocity.

The structuring at the ball of the sole may be carried out in the same manner by forming transversely-extending, longitudinally-spaced openings 24,26 at the inner side of the ball portion of the sole. *These openings also extend from the inner side face transversely substantially at right angles to the longitudinal center line toward the outer side face but short thereof. These openings define an area at the top side of the ball area at the inner side of the longitudinal center line of the ball which is less in area than the entire ball area and which yields at a predetermined pressure to a greater degree than the area at the outer side of the longitudinal center line of the ball area.*

*Sole member or shoe bottom 10 comprises a unitary molded structure defining a forepart including openings 24, 26, heel including openings 12, 14 and a shank joining the heel and forepart. Sole member 10 has imperforate zones at the top and bottom each of less than half its thick-*

*ness for attachment to an upper and constituting a tread surface, respectively.*

Figure 6:
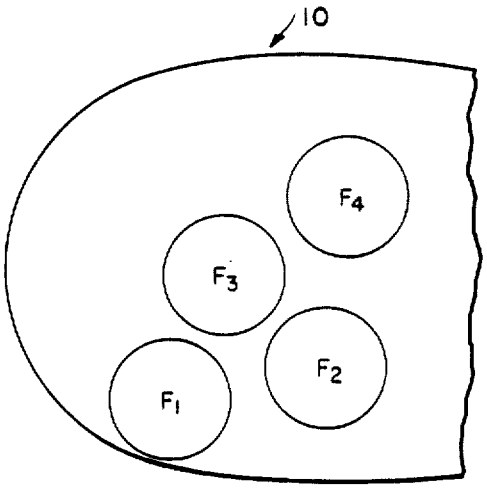
FIG. 6 is a fragmentary plan view of the heel showing the portion at which the deflection curves were derives.
Figure 5:
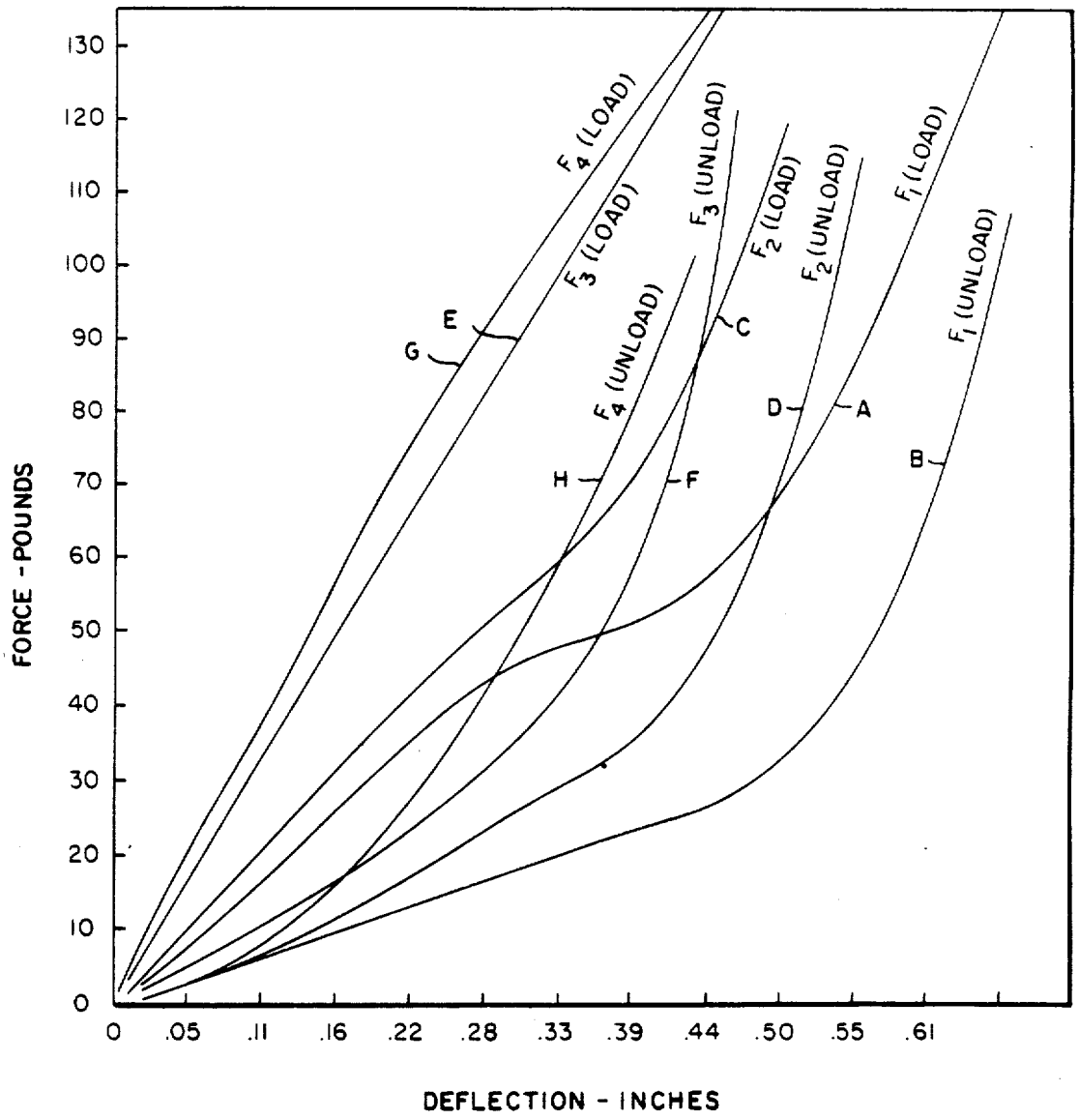
FIG. 5 is a stress force curve showing the deflection at the outer side of the heel of the outsole shown in FIGS. 1 to 4 at a number of points in the area containing the openings.

The cross-sectional, triangular configuration of the openings 12,14 is such that displacement of the outer side of the heel end of the sole upon impact takes place along a stress deflection curve which is represented by the curve A shown in FIG. 6. The curve shows that at a predetermined pressure, the structure of the heel collapses, thus decreasing the deceleration over a distance such as to reduce the force of the impact and thus cushion the foot to an acceptable amount. The stress deflection curve A is taken at a point centered within the circle marked F1, FIG. 5, and as a runner moves forward on the ball portion of the foot, the stress deflection in the bottom unloads along the stress deflection curve marked B. Stress deflection curves are taken in the areas marked F2,F3 and F4, the curves representing these C,E and G and their effective unloading curves D, F and H are also shown in FIG. 1. The stress is in pounds per square inch and the deflection in inches. The design allows a collapse to take place at a force level of approximately 1½ to 3½ times body weight to prevent bottoming and thus it is required that different wall thicknesses be provided for different shoe sizes.

Figure 7:
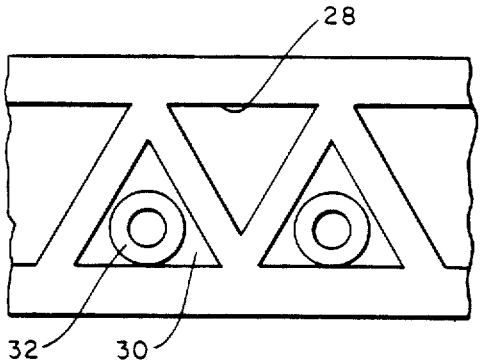
FIGS. 7 and 8 are alternate heel end structures.
Figure 9:
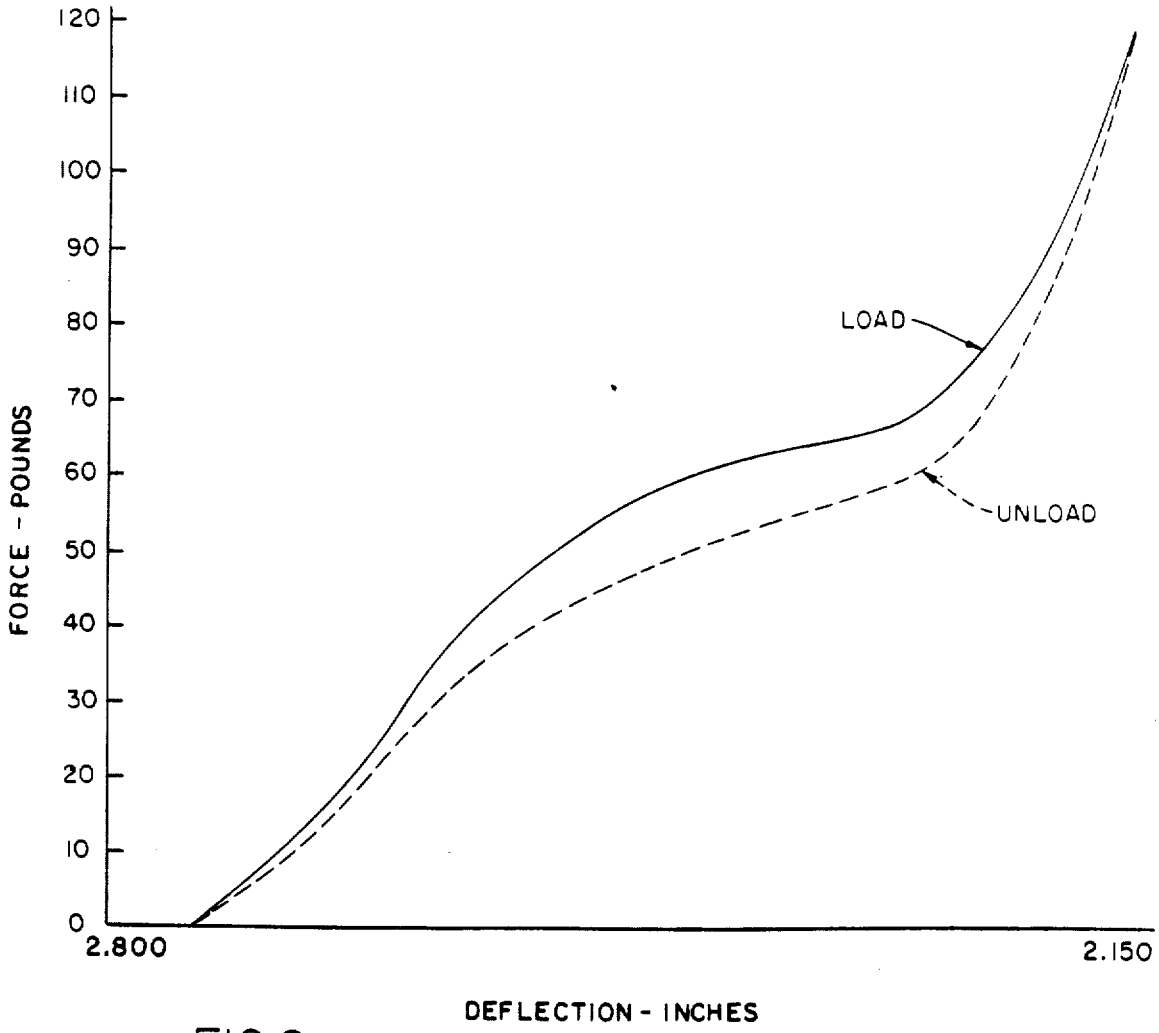
FIGS. 9 and 10 are force deflective curves representing, respectively, FIGS. 7 and 8.
Figure 8:
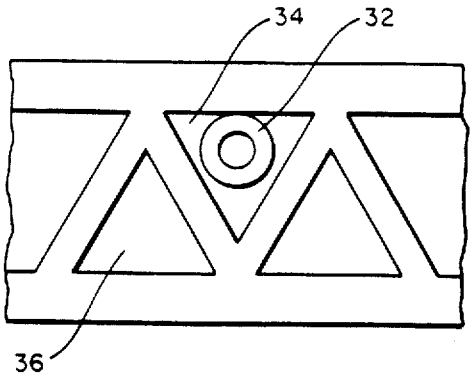
Figure 10:
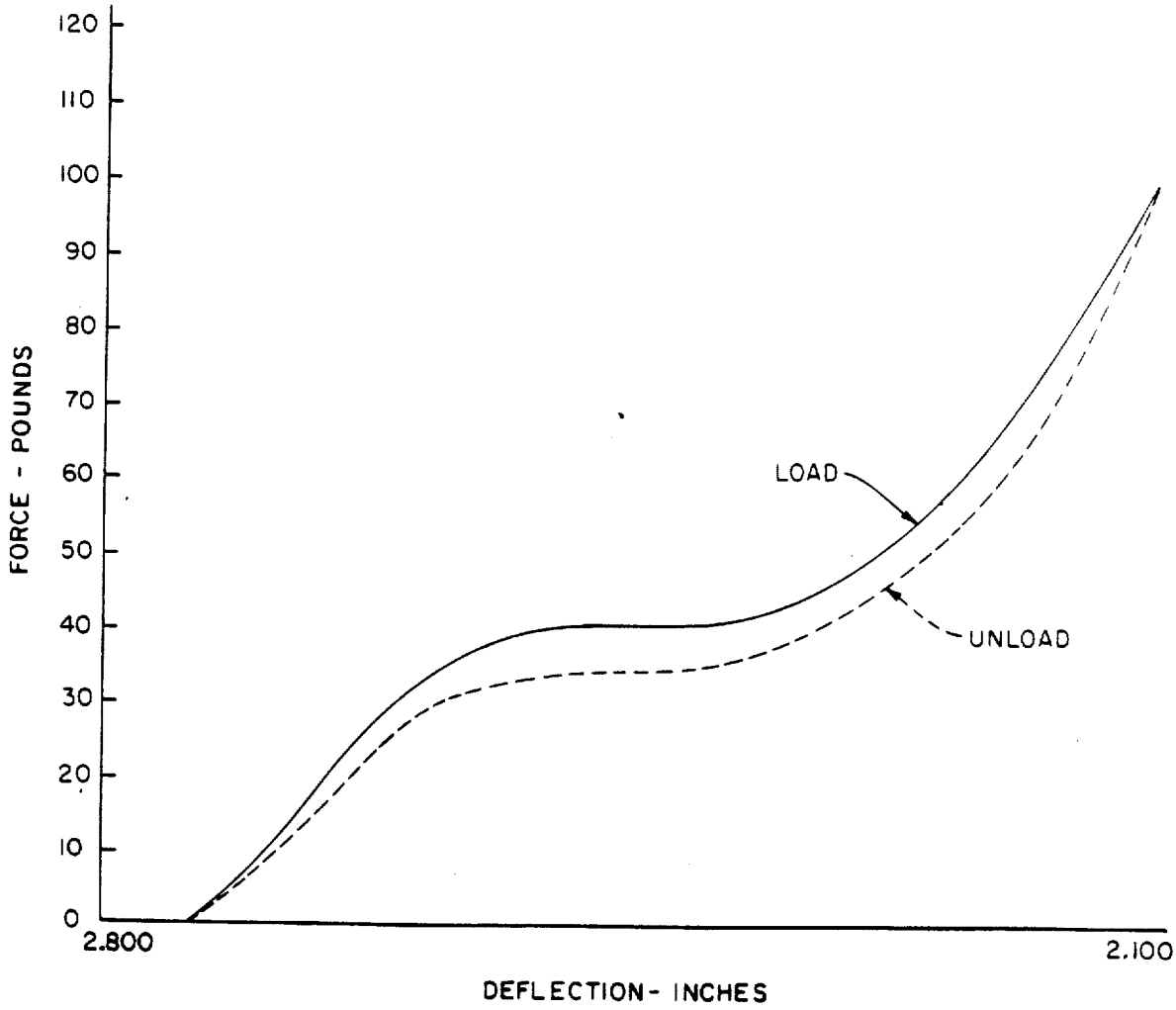

Alternative heel structure is shown in FIGS. 7 and 8. In FIG. 7, the outsole has at the outer side of the heel upper and lower triangular openings 18 and 30 and within the lower opening 30 elastomeric tubes 32, the latter being attached to the base portions of the lower openings. The load deflection curve for this structure is shown in FIG. 9. In FIG. 8, the outer side of the heel end has upper and lower triangular openings 34 and 36 and within the upper opening 34 elastomeric tubes 38, the latter being attached to the bottom portions of the upper openings. The load deflection curves for this structure are shown in FIG. 10. These tubular elements are comprised of gum rubber and, when located in the openings, add resistance to displacement.

The sole member as thus structured is attached in conventional fashion to an upper comprising a forepart and quarters with or without a lining and reinforcement and provided with fastening means such as eyelet stays for receiving the lacing material.

The openings at the heel and ball are illustrated and described as of triangular, vertical section; however, openings of other configuration may be employed with beneficial advantages and, hence, it is considered that the invention includes within its scope to provide openings of any cross-sectional configuration arranged transversely of the area to be relieved and spaced longitudinally of the area.

It should be understood that the present disclosure is for the purpose of illustration only and includes all modifications or improvements which fall within the scope of the appended claims.

I claim:

1. An elastomeric shoe bottom comprising a unitary molded structure defining a forepart, shank and heel having an imperforate zone of less than half the thickness at the top side for attachment to an upper and an imperforate zone of less than half the thickness at the bottom side constituting a tread surface, said structure containing intermediate the imperforate top and bottom zones in the region of major impact at the outer side of the heel longitudinally-spaced, parallel openings extending from the outer side face transversely substantially at right angles to the longitudinal center line, but terminating short of the inner side face of the heel, said openings defining an area at the top side of the heel area at the outer side of the longitudinal center line of the heel which is less in area than the entire heel area which yields at a predetermined pressure to a greater degree than the area at the inner side of the longitudinal center line of the heel.

2. An elastomeric shoe bottom comprising a unitary molded structure defining a forepart, shank and heel having an imperforate zone of less than half the thickness at the top side for attachment to an upper and an imperforate zone of less than half the thickness at the bottom side constituting a tread surface, such structure containing in the region of major impact at the ball at the inner side of the ball longitudinally-spaced, parallel openings extending from the inner side face transversely substantially at right angles to the longitudinal center line toward the outer side face, but terminating short thereof, said openings defining an area at the top side of the ball area at the inner side of the longitudinal center line of the ball which is less in area than the entire ball area which yields at a predetermined pressure to a greater degree than the area at the outer side of the longitudinal center line of the ball.

3. An elastomeric shoe bottom according to claim 1 so structured that the yieldable area will yield at a pressure of from 1½ to 3½ times body weight.

4. An elastomeric shoe bottom according to claim 1 and 2 wherein the openings are continuous.

5. An elastomeric shoe bottom according to claim 4 wherein there are supporting walls between the openings and wherein the walls are of lesser thickness than the breadth of the openings.

6. An elastomeric [shoesole] *shoe bottom* according to claim 1 [or 2] wherein the openings are arranged in upper and lower arrays with the openings in the upper and lower arrays alternating.

7. An elastomeric [shoesole] *shoe bottom* according to claim 1 [or 2] wherein the openings are of triangular cross section.

8. An elastomeric [shoesole] *shoe bottom* according to claim 1 [or 2] wherein an elastomeric tube is positioned in each of the openings.

9. An elastomeric [shoesole] *shoe bottom* according to claim 6 wherein an elastomeric element is positioned in each of the openings of the upper array of openings.

10. An elastomeric [shoesole] *shoe bottom* according to claim 6 wherein an elastomeric element is positioned in each of the openings of the lower array of openings.

* * * * *

UNITED STATES PATENT AND TRADEMARK OFFICE

CERTIFICATE OF CORRECTION

PATENT NO. : RE. 32,412

DATED : May 12, 1987

INVENTOR(S) : Stanley C. Plagenhoef

It is certified that error appears in the above-identified patent and that said Letters Patent is hereby corrected as shown below:

On the title page the inventor's name should read -- Stanley C. Plagenhoef --.

Column 2, line 49, "decleration" should read -- deceleration --.

Signed and Sealed this

Eighth Day of December, 1987

*Attest:*

DONALD J. QUIGG

*Attesting Officer*

*Commissioner of Patents and Trademarks*